United States Patent [19]

Russwurm et al.

[11] Patent Number: 5,372,047
[45] Date of Patent: Dec. 13, 1994

[54] GAS/LIQUID ULTRASONIC FLOWMETER

[75] Inventors: Winfried Russwurm, Regensburg; Alexander von Jena, Munich, both of Germany

[73] Assignee: Siemens Aktiegensellschaft, Munich, Germany

[21] Appl. No.: 930,501

[22] Filed: Sep. 28, 1992

[30] Foreign Application Priority Data

Mar. 29, 1990 [DE] Germany ................................ 4010148

[51] Int. Cl.$^5$ .............................................. G01F 1/00
[52] U.S. Cl. ................................ 73/861.29; 73/861.27
[58] Field of Search ............ 73/861.27, 861.28, 861.29

[56] References Cited

U.S. PATENT DOCUMENTS 4,555,951 12/1985 Gutterman ...................... 73/861.28

FOREIGN PATENT DOCUMENTS 54-135564 10/1979 Japan.
776526 6/1957 United Kingdom.
2146122A 4/1985 United Kingdom.

OTHER PUBLICATIONS

"Ultraschallesensor für hochauflösende Durchflussmessung", A. v. Jena, Siemens 15, No. 3, (1986) Spring-Verlag, pp. 126–134.
"Ultraschall-Durchflussmessung Strömender Gase unter niedrigem Druck für einen breiten Messbereich", TM/Technisches Messen 56, No. 3, Muenchen, Mar. 1989, pp. 112–115.

Primary Examiner—Richard E. Chilcot, Jr.
Assistant Examiner—R. Biegel
Attorney, Agent, or Firm—Hill, Steadman & Simpson

[57] ABSTRACT

Improvement to a gas/liquid ultrasonic flowmeter in which focusing profiling (501, 502, 503) is provided in the measurement tube thereof for at least one of the plurality of reflection points of the ultrasonic path (21) of the useful signal, in such a manner that the beam of this beam path (21) is concentrated onto the surface of the reception transducer (FIG. 3). If required, the focusing reflection is provided for the path of the ultrasonic radiation (22) of the substantial interference signal component.

8 Claims, 2 Drawing Sheets

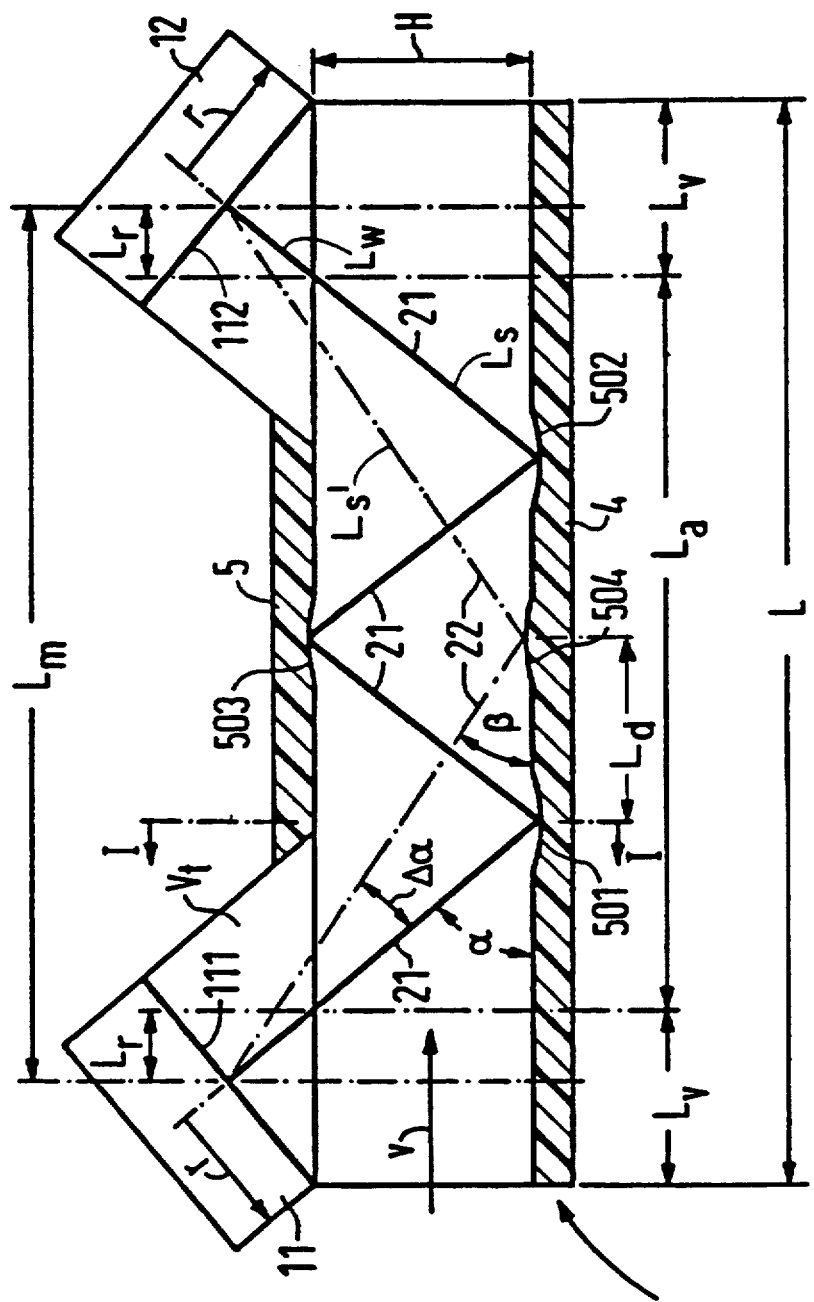
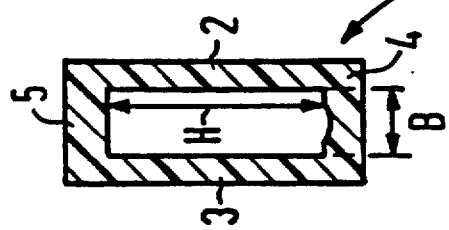

GAS/LIQUID ULTRASONIC FLOWMETER

BACKGROUND OF THE INVENTION

The present invention relates to an improvement to a gas/liquid ultrasonic flowmeter as described in detail in various embodiments in the older German patent applications P 39 41 546.5 (corresponding to PCT publication WO 91/09282) and P 39 41 545.7 (corresponding to U.S. Ser. No. 860,503) and P 39 41 544.9 (corresponding to U.S. Ser. No. 861,861). It is common to the flowmeters of the aforementioned older patent applications that the measurement tube through which the gas or the liquid flows has a rectangular cross-section in the region of the ultrasonic flow measurement. This means that this measurement tube possesses plane sidewalls. It is also common to all these flowmeters that the ultrasound employed for the flow measurement exhibits a W-shaped path with correspondingly three reflections of the ultrasound on such walls of the measurement tube. The expression "W"-shaped" refers to the principle of the path route of the ultrasound. It is also possible to provide ultrasound paths with even more successive reflections between the emission transducer generating the ultrasound and the reception transducer receiving the ultrasound. The fitting of the reception/transmission transducers which must necessarily be provided and the requirement to fit these transducers to the measurement tube so that no significant impairment of the flow of the gas or of the liquid in the measurement tube takes place require the injection of the ultrasound in an oblique direction into the measurement volume of the measurement tube and the ultrasound to be received again by the reception transducer in a corresponding oblique direction.

The aforementioned patent application P 39 41 546.5 relates to a flowmeter with such a rectangular cross-section, the height H of which to the width B of the cross-sectional surface of the flow is greater than 2:1 to 15:1. With such dimensioning of the side relation of the walls of the measurement tube, gas or the liquid flows homogeneously through this portion of the measurement tube, specifically if the transmission/reception transducers are fitted to the measurement tube on the narrow sides having the width B and the height dimension of the cross-section is a component of the path of the ultrasound in the measurement tube. Further pertinent details of the geometric arrangement are evident from the cross-sectional representation in FIG. 1 and the side elevation in FIG. 2.

FIGS. 1 and 2 show, taken together, the elevation in the axial direction of the flow (FIG. 1) and the side elevation of the tube cut in the longitudinal direction (FIG. 2). H and B indicate the above defined dimensions for the height and width of the rectangular tube 1. 2 and 3 designate the sidewalls, and 4 and 5 designate the lower sidewall and the upper sidewall. The same reference symbols are shown in FIG. 2. The transducers 11 and 12 are inserted into the upper sidewall 5, specifically with their transmission and reception surfaces 111 and 112, respectively, directed obliquely to the sidewall 5 (as shown in FIG. 2). The W-shaped ultrasound path 21 is directed at the angle alpha (=a), namely related to the sidewalls 4 and 5. The surfaces 111 and 112 are directed so that the ultrasound path 21 strikes these surfaces perpendicularly.

In principle, however, it cannot be avoided that a component of acoustic energy is also radiated at such an angle from the surface 111 or 112 or is received at an angle from these surfaces that leads to a V-shaped path 22 in the tube interior of the tube 1. The V-shaped path having the angle beta (=b) has a different transit time than the desired W-shaped path, which advantageously has a greater acoustic path length in the tube 1 than is the case for the V-shaped path.

In FIG. 2, the overall length of the flowmeter is indicated by L. The other illustrations in FIG. 2 relate to the physical explanation of the invention which is given in the following text.

SUMMARY OF THE INVENTION

For a flowmeter according to the invention, which flowmeter corresponds to FIGS. 1 and 2 and has triple sound reflections on the lower and upper sidewall, the effective flow velocity $v_{\text{eff}}$ is:

$$v_{\text{eff}} = v^* \cos a \quad (1)$$

where alpha is the angle between the axial flow direction and the direction of radiation or reception of the transducers 11 and 12 and where $v^*$ is flow velocity averaged over the acoustic path. $v^*$ is related to the differential of the volume flow with respect to time, $dV/dt$:

$$dV/dT = v^* \cdot F \quad (2)$$

where F is equal to the cross-sectional surface area H × B. The length $L_s$ of the acoustic path in the moving medium is given by:

$$L_s = \frac{(N+1) \cdot H}{\sin a} = \frac{4H}{\sin a} \text{ for } N = 3 \text{ ("W-arrangement")} \quad (3)$$

where N = number of reflections. With the length of the test section $L_a$ between the penetration points of the ultrasound through the (imaginary) upper sidewall (see also FIG. 2) with respect to the flowing medium $$L_a = (N+1)H \cot a = 4H \cot a \text{ for } N = 3 \quad (4)$$
("W-arrangement")

the attainable transit time difference is given by:

$$\text{Delta } t = \frac{2L_s \cdot v_{\text{eff}}}{c^2} = \frac{2L_a v^*}{c^2} = \frac{2(N+1) \cdot H \cdot v^* \cdot \cot a}{c^2} \quad (5)$$

Although there is flowing medium from the tube inlet to the penetration point (FIG. 2) this is not detected by the ultrasonic beam. This preliminary length $L_v$ depends on the angle of incidence alpha and on the radius r of the transducer, without considering the transducer housing wall thickness:

$$L_v = \frac{r}{\sin a} \quad (6)$$

The acoustic path Lw within the transducer compartments is:

$$L_w = r \cot a \quad (7)$$

This acoustic path causes additional signal attenuation and is therefore kept as small as possible.

The unusable proportion $2L_v/L$ of the overall length $L = L_a + 2L_v$ is computed as follows:

$$\frac{L_w}{L_a} = \frac{r}{4H} \text{ or } \frac{L_v}{L_a} = \frac{L_v}{L-2L_v} = \frac{r}{4H\cos a} \text{ or} \qquad (8)$$

$$\frac{2L_v}{L} = \frac{r}{2H\cos a + r}$$

This proportion depends on the angle of incidence alpha (=a), the transducer radius r and the height H of the tube cross-section. The greater the height of the tube and the smaller the transducer radius r, the greater is the usable proportion. The usable proportion becomes greater with decreasing angle alpha (until at alpha=0 the limiting case of rectilinear sound transmission through the measurement tube without reflections (no longer a "W" arrangement) is obtained). That volume of the transducer compartment which is likewise not usable for the measurement $$V_t = r^2 \cdot \pi \cdot \cot a$$

becomes smaller with increasing alpha for a predetermined r. Accordingly, the influence of the cross-section broadening and narrowing on turbulence and pressure loss becomes smaller.

In the case of the "W" arrangement, the contribution of the parasitic "V" acoustic path 22 is observed as a superimposed interference signal which is radiated at the angle delta a to the normal to the transducer surface 111, 112 ("W" acoustic path) and is reflected once (N=1) at the angle beta.

Local separation of the acoustic paths may be achieved.

The relation delta a=a−b is applicable. For both acoustic paths, the spacing of the transducer centers $L_m$ is constant. For the "W" acoustic path, this spacing is composed of $L_m = L_a + 2L_r$ (FIG. 2). Using the relationship:

$$L_r = r \cot a \cos a \qquad (10)$$

and referring to (4), the following is obtained for the angle delta a:

$$\text{Delta } a = a - \arctan\left(\left(1 - \frac{H}{r\cos a + 2H}\right)\tan a\right) \qquad (11)$$

This means that at a≠0° and ≠90° a greater delta a is achieved by a smaller r and a greater a. If r is not 0 and a is fixed, a greater delta a can still be achieved over the height H. If r is very much smaller than H or r=0, (11) can be expressed more simply by:

$$\text{Delta } a = a - \arctan\left(\frac{\tan a}{2}\right) \qquad (12)$$

Thus, delta a is independent of the height H. In this case, the series expansion for arctan(x) and tan(x) gives the approximate formula:

$$\text{Delta } a = \frac{a}{2} - \frac{a^3}{8} \text{ (arc measure)} \qquad (13)$$

A large delta a means good suppression of the "V" signal amplitude. Thus, the angle of incidence should also be made as large as possible and r very much smaller than H should be satisfied. The spacing of the points of impact $$L_d = L_a/4 = H \cot a \qquad (14)$$

is intended to be at least $L_d$ greater than $2L_v$, i.e. $L_a$ is greater than $8L_v$, in order to keep the coincidence of the two beam paths as small as possible and to permit the reduction of the "V" amplitude by reflection-attenuating elements. Since in most cases $L_a$ is predetermined at a fixed value, attention must be paid to appropriate dimensioning of $L_v$.

Time separation of the acoustic paths may also be achieved.

The length of the acoustic path for r=0 can be described by $L_s$, and the acoustic path for the "V" route can be described by $L'_s$, according to (3) and (12). For the simple case r=0, or r very much smaller than H, the path length difference $dL = L_s - L'_s$ can be described by $$dL = H \frac{4 - 2(3\cos^2 a + 1)^{\frac{1}{2}}}{\sin a} \qquad (15)$$

Using the designations $t_{auf} = L_s/(c - v_{eff})$ for "upstream" and $t_{ab} = L_s/(c + v_{eff})$ for "downstream" for the flow-dependent transit times, the time difference $t_d$ between the arrival of the "V" and "W" signal may be represented as $$t_{d(up)} = \frac{dL}{(c - v_{eff})} \qquad (16)$$

$$t_{d(down)} = \frac{dL}{(c + v_{eff})}$$

The greater $t_d$ is, the better the "V" signal is separated from the "W" signal in time, i.e. evaluation errors due to superimposition effects are reduced (time multiplex). It has to be borne in mind that the time $t_d$ increases in the case of flow upstream and decreases in the case of flow downstream, i.e. the separation capability also decreases. Accordingly, dL should be made so great that, in the case of maximum flow, the two signal components are still adequately separated in time. A larger a, i.e. a steeper radiation incidence and a greater height H, increase dL.

An above mentioned boundary condition is the permissible pressure loss, delta p, which is dependent on the measurement tube geometry as follows:

$$\text{Delta } p \text{ prop } V^{*2} \cdot L \cdot \frac{U}{F} \text{ prop} \left(\frac{dV}{dt}\right)^2 \cdot L \cdot \frac{U}{F^2} \qquad (17)$$

where L=length of the measurement tube and U is the periphery of the cross-sectional surface described by F. This means that the minimum pressure reduction occurs in the case of a square measurement tube design.

In the design of an ultrasonic measurement tube according to the "W" arrangement, in general the maximum measurement tube length $L_a$, the maximum volume throughput dV/dt, the maximum pressure drop delta p when using a specified medium and the maximum overall height H are predetermined. A delta t which is as large possible is to be achieved with the lowest possible interference influence. The angle of incidence can be determined from this maximum effective transducer spacing $L_a$ (=spacing of the two penetration points of the transducer beam on the inner cover surface) and the maximum overall height $H_{max}$:

$$\tan a = \frac{4 H_{max}}{L_a} \qquad (18)$$

The cross-sectional area or the width B of the measurement tube is determined by the pressure loss. In a simple experimental procedure, it is altered to such an extent that the maximum pressure loss is achieved at maximum flow. The cross-sectional area obtained therefrom determines the attainable transit time difference delta t:

$$\text{Delta } t = \frac{2 L_a \cdot dV/dt}{H_{max} \cdot B \cdot c^2} \qquad (19)$$

(18) and (19) give the following for the ratio of the height and width of the measurement tube:

$$\frac{H}{B} = \frac{F \cdot \tan^2 a \cdot c^4 \cdot \text{Delta } t^2}{64 \, (dV/dt)^2} = \frac{L_a^2 \tan^2 a}{16 F} \qquad (20)$$

In the case of an elongate tube ($L_a$ greater than H, $L_a$ greater than B), H/B will be greater than/equal to 2. This means a measurement tube having a cross-section which is significantly non-square and which may have significantly different edge lengths.

In summary, accordingly, for r=constant and the angle alpha (=a) not equal to 0° and 90°, i.e. a beam path with reflections, and N=3, the following criteria arise for the selection of the angle of incidence a:

A good relative exploitation of the measurement tube length, equation 8, can be achieved by the smallest possible angle alpha (=a). A small volume of the transducer compartments (equation 9), a short acoustic path in the transducer compartments (equation 7), a large signal to noise ratio angle (equation 11, equation 12, equation 13), a good absolute exploitation of the measurement tube length (equation 6) and a good time separation of the acoustic paths (equation 15, equation 16) can be achieved by means of an angle a which is in turn as large as possible. Since the signal to noise ratio, i.e. the separation of the acoustic paths, the avoidance of turbulence and an optimum absolute exploitation of the measurement tube length are critical to the quality of the measurement, in practice the selection should be made on the basis of the greatest possible a (e.g. a greater than/equal to 35°). In principle, with $L_a$ predetermined according to equation 18, a is restricted only by the height H, which is limited according to the overall dimensions of the tube. Since, however, important variables (see above) may be optimized over H, H should be made as large as possible (with respect to the width B). However, a large H means additional signal attenuation because of the long acoustic paths $L_s$, which can however be compensated for by a sufficiently high sound level. A high degree of attenuation occurs, for example, when using methane and methane mixtures (with, for example, hydrogen, carbon dioxide ... ).

A practical numerical example:

Measurement tube length $L_a$=150 mm, pressure drop delta p=2 mbar, maximum volume flow dV/dt=0.00167 m³/s, medium air (speed of sound c=340 m/s at room temperature), r=5 mm. Experimentally, the pressure drop permits the cross-sectional area F=1.2 cm². The maximum overall height is H=31.5 mm. Accordingly, the angle of incidence becomes a=40° and the width B=3.8 mm. This gives the value 8.25 for the ratio H/B. The usable transit time difference will be delta t=36 μs. Further variables: signal to noise ratio angle (using equation 11) delta=16.1°, $L_v$=7.8 mm, L=165.5 mm, $2L_v/L$=0.094, i.e. 90.6% of the measurement tube length is utilized. The volume of the measurement tube is V=19.9 cm³, the volume of the transducer compartments $V_t$=2×0.47 cm³. Since $8L_v$=62 mm is smaller than $L_a$=150 mm, there is a good local selectability of the acoustic paths. The variable dL is determined as 33.2 mm. Thus, when the medium is not moving, the "V" signal arrives approximately 98 μs before the "W" signal.

As may be discerned from the numerical example, the ratio of the edge lengths is extreme. However, a further advantage becomes apparent: in the case of a square cross-section of equal area, H=B=11 mm would be applicable and thus the side facing the transducers would be wider than the actual transducer. This would result in sound passing homogeneously through the measurement space, with consequent serious measurement errors. With a ratio H/B greater than 2, the side facing the transducers will be narrower than the transducer, and thus a homogeneous acoustic flow is made possible. A measurement tube cross-section with an extreme edge ratio can also, in consequence of its flow directing property, be capable of minimizing turbulence arising at the flow inlets or at the transducer compartments or upstream that has been drawn into the measurement tube and thus contributes further to the measurement accuracy, reproducibility and signal stability of the ultrasonic measurement process.

Using a measurement tube 1 dimensioned according to the invention with a rectangular cross-section and using the transducer arrangement and dimensioning for homogeneous sound passage, it is possible reliably to perform flow measurements for the range 5 l/h to 30 m³/h. For example, a dimensioning H:B of 30 mm to from 5 to 6 mm is appropriate for this purpose. With the maximum flow quantity, the pressure drop can rise to 25 mbar. Using electronic recorrection, such a flowmeter can be used as an accurate measuring instrument from 30 m³/h even down to 1 l/h.

The aforementioned patent application P 39 41 545.7 describes a pertinent flowmeter in which a variation from the flowmeter of the above aforementioned patent application P 39 41 546.5 is used, namely the use of the ultrasound of such a W-shaped path. The transmission angle at the transmission transducer and the reception angle of which at the reception transducer are an angle other than 90° to the transmission/reception surface 111, 112. This deviation from the 90° angle can be effected by enlarged or reduced spacing of the transducers 11, 12 or by intentional angle misorientation of the fitting of these transducers. In these embodiments, use is made of the fact that the intensity of ultrasonic beam is dependent on the angle to the transmitting or receiving surface of the transducer. The effect of this measure is that ultrasound transmitted on a path other than the W-shaped path between the transmitting transducer and receiving transducer, e.g. sound transmitted on the V-shaped path 22, is relatively attenuated in its intensity.

These measures serve to emphasize the useful signal rather than the undesired parasitic signal.

With regard to further details concerning this embodiment, reference is made to patent application P 39 41 545.7, which is hereby made a component part of the present application.

In the flowmeter of the aforementioned patent application P 39 41 544.9, use is made of the fact that ultrasonic waves can be caused to cancel one another out in the difference. A stage is fitted to the cross-section of the measurement tube, specifically at the location of the reflection of the already mentioned parasitic V-shaped ultrasound beam path, on the inside of the measurement tube, which leads to a situation in which a component of this parasitic radiation of the V-shaped path is reflected with a phase which is opposite to the phase of the reflection of the other component of this radiation. Accordingly, it is possible without difficulties to achieve a significant attenuation of the signal of the parasitic V-shaped path, compared with the desired signal of the W-shaped path. With regard to further details, reference is made to the description of patent application P 39 41 544.9, which is likewise made part of the content of the present application.

The object of the present invention is to specify an improvement to a flowmeter of the above mentioned older patent application, by means of which the ratio of the useful signal (of the W-shaped path) to the parasitic signal (of the V-shaped path) is also further improved.

An ultrasonic flowmeter having a measurement tube through which gas/liquid is to flow and having ultrasonic transmission/reception transducers that are located in the flowmeter to produce a "W"-shaped ultrasonic path running in the measurement tube with multiple reflections provided in the measurement tube. The transducers are mounted at a given distance from one another on one and on a common sidewall of the measurement tube. To improve the useful signal/extraneous signal ratio, the extraneous signal being based on a parasitic "V"-shaped ultrasonic path occurring as is known in the measurement tube, at at least one of the reflection points of the "W"-shaped ultrasonic path, focusing curvature of the surface portion, causing the respective reflection, of the internal surface of the measurement tube wall is present. This surface portion is dimensioned to match the aperture angle +/− delta, and the total focusing of the beam-shaped ultrasonic radiation at the location of the reception transducer striking the reception surface thereof.

The following are advantageous developments of the present invention. A plurality of the reflection points of the ultrasonic radiation of the "W"-shaped path of the useful signal radiation together effect this focusing between the transmission transducer and the reception transducer or the transmission transducers taken together.

For the "V"-shaped ultrasonic path of parasitic ultrasonic radiation between the transmission transducer and the reception transducer, defocusing profiling of the surface of the internal wall of the measurement tube is provided.

Spherical profiling of the at least one reflection point of the ultrasonic path of the useful signal radiation is present.

Cylindrical profiling of the at least one reflection point of the ultrasonic path of the useful signal radiation is present.

Parabolic profiling of the at least one reflection point of the ultrasonic path of the useful signal radiation is present.

Profiling with, related to the directions of the tube dimensions, differing focusing curvatures of the at least one reflection point of the ultrasonic path of the useful signal radiation is present.

The measurement tube exhibits a rectangular cross-section corresponding to the patent application P 39 41 546.5.

The arrangement of the transmission transducer and reception transducer relative to one another is dimensioned in accordance with the patent application P 39 41 545.7.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

FIG. 1 is a cross-sectional view of an ultrasonic flowmeter according to the present invention;

FIG. 2 is another cross-sectional view of the FIG. 1 flowmeter; and

DESCRIPTION OF THE PREFERRED EMBODIMENT

Figure 3:
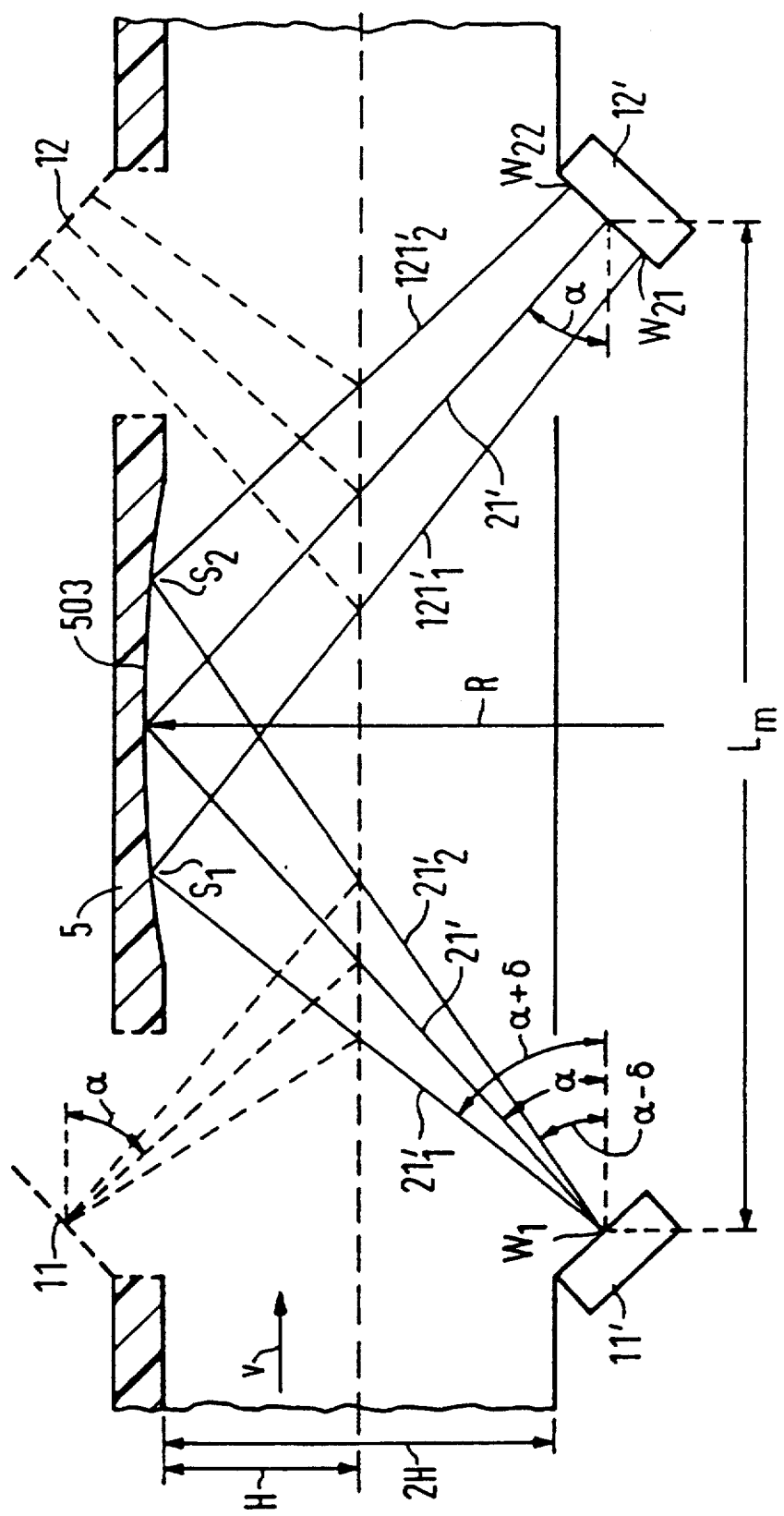
FIG. 3 is a cross-sectional view of an ultrasonic flowmeter according to the present invention.

As may be seen from the accompanying FIG. 2, in the flowmeters of the aforementioned patent application the reflection of the ultrasonic radiation takes place at the location 501 and at the location 502, as well as also at the location 503 on a planar surface. The aperture angle of the radiation emitted by the transmission transducer 11 (the same applies to the transducer 12 if the latter is operated as the transmission transducer) has a finite angular dimension of for example d=15°. This means that divergent ultrasonic radiation is emitted from the transmission transducer; in this case, the divergence angle, as is known, depends on the ultrasound wavelength and the geometric dimensions and also details of the embodiment of the transducer. The reception characteristic of such an ultrasonic transducer also has a corresponding divergence angle in its operational phase as a reception transducer.

Using the invention, it is brought about by additional focusing at at least one of the reflection points 501 to 503 that the increasing spreading of the ultrasonic beam 21 is kept within bounds or is reduced.

By selection of the curvature of the reflecting surfaces 501 to 503, it is also possible to achieve focusing in the direction B. FIG. 2 shows, in its cross-sectional representation, the curvature $r_H$, with which an ultrasound beam in the plane of the representation of FIG. 2 can be achieved. The curvature $r_B$ evident from FIG. 1 serves for concentration of the beam path 21 in the plane which is perpendicular to the representation of FIG. 2 (the projection of which is the plane of the cross-section of FIG. 1).

Accordingly, no such measure according to the invention is provided for the V-shaped parasitic ultrasound path 22. By a slight wall curvature at the point 504, and specifically by such a wall curvature which brings about the scattering of the reflected ultrasonic beam 22, it is however additionally possible to increase the relationship of the useful signal to the parasitic signal. The above described focusing curvatures 501 to 503 and the defocusing curvature 504 in the internal wall of the measurement tube are, in terms of the ratio to the dimensions H and B, so small that they have no disturbing influence on the flow of the gas or of the liquid in the measurement tube. Corresponding considerations apply to dimensioning of the defocusing curvature $r_D$ at the location 504 of the reflection of the parasitic radiation 22, whereby—since defocusing is involved in this case—no particular effort is required for optimum dimensioning. For the dimensioning of the curvatures $r_H$ and $r_B$ for the reflecting surfaces 501 to 503, it is optimal if minimum beam divergence is achieved at the location of reception of the ultrasound 21 of the W-shaped path. In this case, it is true that the optimal focusing curvatures are applicable both for the outward path and for the return path, i.e. in the event that the transducer 11 is the transmission transducer and the transducer 12 is the reception transducer, and conversely the transducer 12 is the transmission transducer and the transducer 11 is the reception transducer.

The following computation example, FIG. 3, relates to a single provided focusing reflection (to the reflection 503); in this case, the other reflections of the W-shaped path 21 of FIG. 1 are disregarded. In this example, the W-shaped path is considered for the computation and, as shown in FIG. 3, is "folded up" into an ultrasonic path with only one reflection. The actual W-shaped path of FIG. 1 is shown in broken lines in FIG. 3.

Independently of the equations 1 to 20 indicated in or derived from the introduction to the description, the further equations 21 to 24 specified for the W-shaped path are applicable.

As indicated above, with the angle alpha (=a) the ultrasonic radiation of the unfolded W-shaped path is here in FIG. 3 injected as the beam path 21' into the measurement tube 1 having the sidewalls 2 to 5, the height 2H and the width B. Correspondingly, the ultrasonic radiation impinges on the ultrasonic transducer 12', operated as reception transducer, at this angle a.

The following is applicable:

$$\tan a = \frac{4H + 2r \cos a}{L_m} \quad (21)$$

where r is again the radius of the transducer, H the relevant dimension of the measurement tube 1 and $L_m$ the spacing of the centers of the transducers in FIG. 2.

The length $L_s$ is $$L_s = \frac{(N + 1) H}{\sin a} = \frac{4H}{\sin a} \quad (22)$$

The length of the acoustic paths within the two transducer compartments is $$L_w = r \cot a \quad (23)$$

so that the following emerges as the total acoustic path $L_{tot}$:

$$L_{tot} = L_d + 2L_w \quad (24)$$

this being the total acoustic path from the sound-emitting surface of the transducer 11' to the sound-receiving surface of the transducer 12', namely that acoustic path which is to be considered for the focusing between the sound-emitting surface and the sound-receiving surface.

As has already been mentioned above, FIG. 3 reproduces the explanation for the computation of a focusing reflection of the useful signal. 21' indicates the central ray of the beam, and 211' and 212' designate assumed marginal rays.

In FIG. 3, the flat curvature is indicated by the radius R this example being intended to comprise a spherical or cylindrical (concave) mirror. The focusing action can be discerned from FIG. 3.

Using the measure according to the invention, the ultrasonic transducer operated respectively as the reception transducer is reached by a higher proportion of the acoustic power which has been emitted by the transducer operated respectively as the transmission transducer. Since no such focusing is provided for the parasitic path (see FIG. 2), this focusing plane benefits only the useful signal and the improved useful signal/extraneous signal ratio. In a manner corresponding to the teaching of the invention as reproduced here for the sake of simplicity with reference to the "example", it is possible mutatis mutandis to apply the focusing measure for the W-shaped path of the useful signal, to which measure three reflections within the measurement tube 1 are then apportioned therein. The optimum selection depends on the individual case. The provision of only a single focusing reflection is, for example, less demanding from the technical point of view. On the other hand, multiple focusing prevents a situation in which the beam of the ultrasonic radiation is more intensively broadened; this is, for example, again advantageous with a small magnitude of the width B, With a concave mirror reflector 503 and with such a dimensioning that the transmission transducer is situated at the focus of this concave mirror, the incidence surface on the reception transducer can be described as $$F_f = 2bL_{tot} \tan(\text{Delta}/2) \quad (25)$$

With a small width B it is in general sufficient to provide, in place of a spherical mirror, a reflecting cylindrical envelope surface with the axis of rotation of the cylinder perpendicular to the plane of the representation of FIG. 3 (or of FIG. 2).

In the case of the "W" arrangement paraxial rays are not reflected, as represented here in the first instance in an idealized fashion, but rays falling onto the mirror plane at the angle a (see FIG. 3).

Thus, the homocentric beam does not remain homocentric any longer after the reflection; no clearly defined image and no parallel beam are formed. As a result of the strong deviation from paraxial conditions and as a result of the imaging defects in the relevant reflector, the transmission transducer is not situated in the theoretical focal plane, but is situated at a shorter distance from the reflector plane. It must be ensured that the beam impinges upon the reception transducer under all flow conditions, especially having regard to the beam drift which occurs.

Further support, which is however necessary only in particular cases, can be inferred from the following embodiments.

Reference is again made to FIG. 3, and for the "shown", actually W-shaped beam path of the useful signal, the height H' is twice as great as the actual height H of the measurement tube. FIG. 2 shows a practical arrangement of the transducers in a W measurement tube, the first and the third reflection having been "folded up", as these are not relevant for the purposes of the following considerations. To this end, it is however necessary to double the height H. The transmitting transducer 11' is shown as a point source. A cartesian coordinate system is introduced, having its origin at the vertex of the concave reflector (i.e. the y axis is the mirror axis of the system and the x axis passes through the vertex of the reflector). In the text which follows, an empirical method for the determination of a favorable mirror radius is described. To this end, the transmission transducer is regarded as a point source (homocentric beam). Let the divergence angle be delta (=d). Since, as already mentioned, after the mirror reflection there is no longer any stigmatic imaging, or it is no longer possible to achieve a parallel beam, it is intended to be achieved that all rays within the divergence angle strike the reception transducer. To this end, the ray respectively provided under (a+/−d/2) is to strike in each instance the corner point of the reception transducer (see FIG. 3).

The coordinates are known of the transmitting point source $W_1$ ($x_1$;$y_1$) as the center of the transmission transducer 11, as well as the corner points of the reception transducer 12 $W_{21}$ ($x_{21}$; $y_{21}$) for the upper corner point and $W_{22}$ ($x_{22}$; $y_{22}$) for the lower corner point. The angle of incidence a is determined by means of the straight lines 21' gO. Proceeding from the transmission transducer, the straight lines $21_1'$ and $21_2'$ which occur at the angle (a+d/2) and (a−d/2) are determined.

By way of an approximation, let the mirror curvature be negligible, so that the points of intersection $S_1$ and $S_2$ of the x axis with $21_1'$ and $21_2'$ can be determined. The linear equations $121_1'$ and $121_2'$ are established with the aid of $S_1$ and $W_{21}$, or $S_2$ and $W_{22}$ respectively. It now still remains to determine the point of intersection of the angle bisectors of $21_1'$ and $121_1'$ or respectively of $21_2'$ and $121_2'$ with the y axis (i.e. x=0), which then represents the radius of the concave mirror. For reasons mentioned above, two slightly differing radii will emerge. The focal length is then obtained as f=r/2. Moreover, on account of the assumption made, the solution obtained is still subject to certain errors, so that in practice fine tuning is still required on the present transmission section.

The following example relates to an improvement, according to the invention, of an earlier illustrative embodiment. In that case the width was B=6 mm, the height H=30 mm, the angle of incidence a=38°, the spacing $L_m$=165 mm, and the divergence angle d=15°. The concave mirror now provided exhibits, as against the height H, a depth of 3 mm; the reflection points are also intended to be situated there. The transducer radius is r=7 mm.

The result is the value $L_m$=179.12 mm. Two different concave mirror radii $R_1$=220 mm and $R_2$=211 mm are obtained. As a result of the mirror depression, a chord length S at the transition to the actual measurement channel of approximately 72 mm is obtained. Checking by experiment showed that the optimal signal gain is achieved with a radius of approximately 220 mm. In this case, the signal gain is approximately 6 dB.

In principle, focusing elements could also be provided at all three reflection locations. However, the corresponding concave mirror radii have to be matched. At the reflection location of the parasitic "V" signal it would be possible to provide a defocusing measure to improve the signal to noise ratio with respect to the useful signal (convex reflector). The described focusing measure can also be applied to measurement tubes which, in contrast to the "W" sound path, exhibit a sound path with one reflection ("V" measurement tube).

In the above text, only a spherical reflector was mentioned. A parabolic reflector would give even better imaging properties.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An ultrasonic flowmeter having a measurement tube through which a fluid flows and having ultrasonic transducers operable as transmission transducers and reception transducers, comprising:

the ultrasound transducers being attached to a first sidewall of the measurement tube at a predetermined spacing from one another, and the ultrasound transducers having an associated principal ultrasound direction of transmitted ultrasound waves that defines a "W"-shaped ultrasonic path in the measurement tube;

the measurement tube having a second sidewall opposed to the first sidewall, the "W"-shaped ultrasonic path defining a plurality of reflection locations on said first and second sidewalls relative to the transmitted ultrasound waves, and the second sidewall having convex area for dispersing a part of the transmitted ultrasound waves that departs from the principal ultrasound direction; and the measurement tube having at least one concave area in at least one of the reflection locations of the first and second sidewalls of the measurement tube for providing a focusing effect of the ultrasound waves that are transmitted along the "W"-shaped ultrasonic path.

2. The flowmeter according to claim 1, wherein the plurality of the reflection locations of the ultrasonic path of the "W"-shaped path of the useful signal radiation together effect this focusing effect between the transmission transducer and reception transducer or between both of the transmission transducers.

3. The flowmeter according to claim 1, wherein the concave area is a spherical profiling of the at least one reflection location of the first and second sidewalls.

4. The flowmeter according to claim 1, wherein the concave area is a cylindrical profiling of the at least one reflection location of the first and second sidewalls.

5. The flowmeter according to claim 1, wherein the concave area is a parabolic profiling of the at least one reflection location of the first and second sidewalls.

6. The flowmeter according to claim 1, wherein the concave area is a profiling with, related to a length and width of the tube dimensions, differing focusing curvatures of the at least one reflection location of the first and second sidewalls.

7. The flowmeter according to claim 1, wherein the measurement tube has a rectangular cross-section having a height and a width wherein a height to width ratio thereof is greater than 2.

8. The flowmeter according to claim 1, wherein, relative to the transmission transducer and reception transducer, an angle is formed, by the ultrasonic path of useful signal radiation at a surface of a respective transducer that is not equal to 90°.

* * * * *